United States Patent
Jhe et al.

(10) Patent No.: US 11,874,203 B2
(45) Date of Patent: Jan. 16, 2024

(54) NANO PRINTING DEVICE AND RAMAN ANALYSIS APPARATUS USING SAME

(71) Applicant: SEOUL NATIONAL UNIVERSITY R&DB FOUNDATION, Seoul (KR)

(72) Inventors: Won Ho Jhe, Seoul (KR); Sang Min An, Gyeonggi-do (KR); Chung Man Kim, Seoul (KR); Jong Geun Hwang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 427 days.

(21) Appl. No.: 17/424,610

(22) PCT Filed: Jan. 21, 2020

(86) PCT No.: PCT/KR2020/000982
§ 371 (c)(1),
(2) Date: Jul. 21, 2021

(87) PCT Pub. No.: WO2020/153696
PCT Pub. Date: Jul. 30, 2020

(65) Prior Publication Data
US 2022/0120691 A1 Apr. 21, 2022

(30) Foreign Application Priority Data

Jan. 21, 2019 (KR) .................. 10-2019-0007726
Jan. 21, 2019 (KR) .................. 10-2019-0007727

(51) Int. Cl.
*G01N 21/65* (2006.01)
*B01L 3/02* (2006.01)
*B82B 3/00* (2006.01)
*B82Y 40/00* (2011.01)

(52) U.S. Cl.
CPC ............ *G01N 21/658* (2013.01); *B01L 3/021* (2013.01); *B82B 3/0004* (2013.01); *B82Y 40/00* (2013.01)

(58) Field of Classification Search
CPC ..... G01N 21/658; B01L 3/021; B82B 3/0004; B82Y 40/00; B82Y 30/00
USPC ....................................................... 356/301
See application file for complete search history.

(56) References Cited

U.S. PATENT DOCUMENTS

2017/0173945 A1   6/2017  Byun et al.

FOREIGN PATENT DOCUMENTS

| JP | 2005-349496 A | 12/2005 |
|----|---|---|
| JP | 2017-053703 A | 3/2017 |
| KR | 10-2011-0133778 A | 12/2011 |
| KR | 10-2014-0040177 A | 4/2014 |

(Continued)

OTHER PUBLICATIONS

International Search Report for PCT/KR2020/000982 dated Aug. 13, 2020.

(Continued)

*Primary Examiner* — Md M Rahman
(74) *Attorney, Agent, or Firm* — PLEECHAE IP, LLC

(57) ABSTRACT

A Raman spectroscopy apparatus using a nano printing device is provided to perform Raman spectroscopy on nanoscale nanostructures printed from the nano printing device. The Raman spectroscopy apparatus includes a laser light source configured to generate and emit a laser light to the nanostructures, and a Raman detector configured to collect spectroscopic information from the light scattered by the nanostructures.

15 Claims, 10 Drawing Sheets

(56) References Cited

FOREIGN PATENT DOCUMENTS

KR  10-2015-0099691 A  9/2015

OTHER PUBLICATIONS

Sangmin An et al., "Low-volume liquid delivery and nanolithography using a nanopipette combined with a quartz tuning fork-atomic force microscope" Nanoscale, vol. 4 (20), pp. 6493-6500, 2012 http://dx.doi.org/10.1039/c2nr30972f.

NANO PRINTING DEVICE AND RAMAN ANALYSIS APPARATUS USING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/000982, filed Jan. 21, 2020, which claims priority to the benefit of Korean Patent Application Nos. 10-2019-0007726 filed on Jan. 21, 2019 and 10-2019-0007727 filed on Jan. 21, 2019 in the Korean Intellectual Property Office, the entire contents of which are incorporated herein by reference.

BACKGROUND

1. Field

The present invention relates to a nano printing device and a Raman analysis apparatus using the same.

2. Description of Related Art

With the development of 2D and 3D printing techniques, innovative development of the industry is taking place. Meanwhile, interest in the precision of printing techniques and need for overcoming limitations have been increasingly attracting attention.

However, even if reducing a size of a nozzle hole to a nano scale for precise printing, a printing liquid cannot be easily ejected, which is due to specificity of a liquid containing nano size particles.

Existing printing techniques are a method of ejecting a liquid by applying a very strong voltage or pressure through a hole of a micro-sized nozzle, and attempts are being made to reduce the size of the nozzle hole to a nano scale. However, since a force of the surface tension acting on an inner wall of the nozzle hole is too strong, it is difficult to eject the liquid even under a very high voltage and pressure.

A Raman spectroscopy apparatus is an apparatus using spectroscopic techniques to observe oscillations, rotations and other low-frequency modes in a system. This technique is usually based on Raman scattering of monochromatic light such as a visible or near-infrared region, or a laser in the near-infrared region. When light passes through a medium, some of the light is scattered and deviates from the direction of travel and travels in another direction. In this case, an elastic process in which the scattered light is scattered while maintaining the original energy is referred to as Rayleigh scattering, and an inelastic process in which the scattered light is scattered while losing or gaining energy is referred to as Raman scattering or inelastic scattering.

When molecules are exposed to light, the molecules are excited to an excited state, and these molecules in the excited state are brought down to a ground state again through the following three ways. First, when the molecules fall to the ground state while emitting all of an energy of light incident from a light source, the light having the same energy as the light incident from the light source is scattered and emitted. This case is referred to as Rayleigh scattering described above. On the other hand, a case, in which the molecules return to the ground state after absorbing or emitting as much as the oscillational energy thereof, is referred to as Raman scattering described above. At this time, transition of the molecules in the oscillation state occurs. A case, in which the molecules return to the ground state after absorbing oscillational energy, is referred to as Stokes effect. At this time, since the energy of radiant rays is absorbed by the molecules, light having a lower energy, that is, a longer wavelength than the light incident from the light source is scattered. On the other hand, a case, in which the molecules return to the ground state after releasing the oscillational energy thereof, is referred to as an anti-Stokes effect. In this case, since the radiant rays are a state in which energy is gained from the molecules, light having a higher energy, that is, a shorter wavelength than the light incident from the light source is scattered and emitted. Through this Raman scattering process, energy exchange between the light incident from the light source and a material occurs. Energy absorbed or emitted by the material is closely related to a molecular structure constituting each material, and scattered light due to Raman scattering is unique to each material. Therefore, by analyzing the scattered light, it is possible to deduce the molecular structure of the material. In general, such a change can be measured by observing how much energy the light loses or gains before and after scattering. A change in the spectrum before and after scattering is referred to as a Raman shift. The Raman shift corresponds to an oscillational frequency of the molecules.

In addition, Raman spectroscopy is a method of performing qualitative and quantitative analysis of each material by measuring a unique oscillation spectrum of a material to determine a unique spectrum of the material. In other words, Raman scattering is the inelastic scattering of photons that can provide oscillational fingerprints of the molecules.

In analyzing this Raman spectroscopy, when an object to be measured has a nanoscale size, it is difficult to determine a position of the object to be measured, and contamination or deformation of the object to be measured may occur due to a movement of the object to be measured and a time delay for analysis.

SUMMARY

An object of the present invention is to provide a nano printing device having an improved structure.

In addition, another object of the present invention is to provide a nano printing device which is capable of performing printing at a nanoscale together with analysis thereon.

Further, another object of the present invention is to provide a Raman analysis apparatus using the nano printing device having an improved structure.

Furthermore, another object of the present invention is to provide a Raman analysis apparatus using the nano printing device which is capable of performing printing of nanostructures together with Raman analysis on the nanostructures.

According to an aspect of the present invention, there is provided a nano printing device including: a nanopipette which includes a pipette body having a discharge hole formed in one end portion thereof and configured to contain a liquid solution, and a plating layer formed on an outer surface of the pipette body; a substrate having a metal layer and on which nanostructures formed from the liquid solution discharged from the nanopipette are placed; a first power supply unit configured to apply heat to the nanopipette, wherein the first power supply unit electrically connects the liquid solution of the pipette body and the plating layer; and a second power supply unit configured to reduce a surface tension of the liquid solution at the discharge hole, wherein the second power supply unit electrically connects the plating layer and the metal layer. The first and second power supply units may be configured to be operated independently from each other.

The first and second power supply units may be configured to be operated at voltages different from each other.

The first power supply unit may be configured to reduce a viscosity of the liquid solution by heating the pipette body.

The plating layer may be configured to cover at least an end portion of the pipette body.

The plating layer may include at least one of gold and silver.

The second power supply unit may be configured to form a nanochannel for guiding a movement of the liquid solution between an end of the nanopipette having the discharge hole formed therein and the substrate.

The nano printing device may further include a quartz tuning fork provided to be in contact with the nanopipette, wherein the quartz tuning fork may be configured to detect a phase and an amplitude generated at the end of the nanopipette.

The phase and amplitude may satisfy the following equations:

$$k_{int} = \frac{F}{A}\sin\theta + m\omega^2 - k$$

$$b_{int} = \frac{F}{A\omega}\cos\theta - b$$

$$F_k = k_{int}A$$

$$F_b = b_{int}\omega A$$

$$E_{dis} = \frac{\pi k A_0^2}{Q}\left[\frac{A}{A_0}\cos\theta - \frac{\omega}{\omega_0}\left(\frac{A}{A_0}\right)\right]$$

(wherein, kint denotes an elastic coefficient, bint denotes a viscosity coefficient, Fk denotes an elastic force, Fb denotes a viscous force, Edis denotes an energy dissipation, and Q denotes a quality factor).

According to another aspect of the present invention, there is provided a Raman analysis apparatus using the nano printing device according to an aspect of the present invention, that is, a Raman spectroscopy apparatus using the nano printing device configured to analyze nanostructures formed from the nano printing device, wherein the nano printing device includes: a nanopipette which includes a pipette body having a discharge hole formed in one end portion thereof and configured to contain a liquid solution, and a plating layer formed on an outer surface of the pipette body; a substrate having a metal layer and on which nanostructures formed from the liquid solution discharged from the nanopipette are placed; a first power supply unit configured to electrically connect the liquid solution of the pipette body and the plating layer so as to apply heat to the liquid solution; and a second power supply unit configured to reduce a surface tension of the liquid solution at the discharge hole, wherein the second power supply unit electrically connects the plating layer and the metal layer, and the Raman spectroscopy apparatus includes: a laser light source configured to generate and emit a laser light to the nanostructures; and a Raman detector configured to collect spectroscopic information from the light scattered by the nanostructures.

The nanostructures may be subjected to tip-enhanced Raman spectroscopy (TERS) performed through the plating layer connected with the first and second power supply units.

The plating layer may include at least one of gold and silver.

The plating layer may be configured to cover at least an end portion of the pipette body.

The first and second power supply units may be configured to be operated independently from each other.

The first and second power supply units may be configured to be operated at voltages different from each other.

The Raman analysis of the nanostructure may be provided to be performed together with formation of the nanostructures by the nano printing device.

The laser light source may be configured to generate a laser light having at least one of wavelengths of 488 nm, 532 nm and 633 nm.

According to an aspect of the present invention, it is possible to perform printing at the nanoscale.

In addition, according to another aspect of the present invention, the liquid solution may be easily discharged from the nanopipette.

Further, according to another aspect of the present invention, it is possible to determine physical properties of the liquid solution through the nano printing device.

Further, according to another aspect of the present invention, it is possible to facilitate Raman analysis on the nanoscale structures.

Furthermore, according to another aspect of the present invention, printing at the nanoscale and Raman analysis on the printed nanostructures may be performed together in real time.

Furthermore, according to another aspect of the present invention, Raman analysis may be performed more precisely than existing technology.

DETAILED DESCRIPTION

Figure 1:
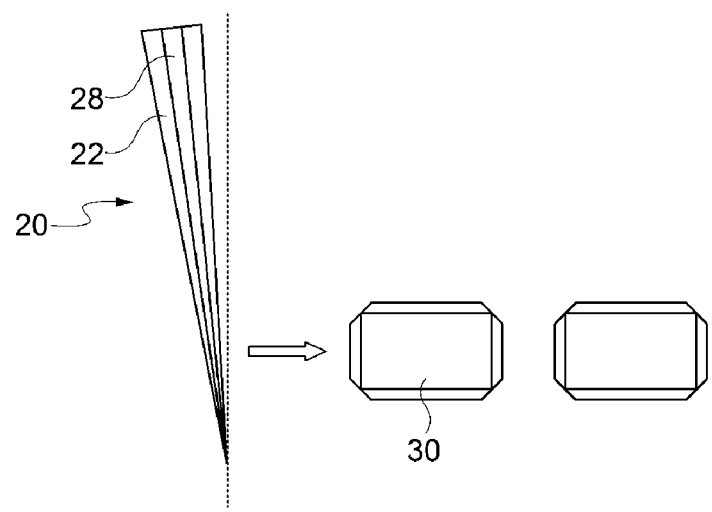
FIGS. 1 and 2 are views illustrating a nanopipette and a quartz tuning fork of a nano printing device according to an embodiment of the present invention.

Configurations illustrated in the embodiments and drawings of the present disclosure are only preferred examples of the invention, and diverse modifications capable of replacing the embodiments and drawings of the present disclosure may be possible at a time of filing the present application.

Further, the same reference numerals or symbols in the drawings of the present disclosure will represent parts or components having substantially the same functions.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, the terms including numerals such as "first," "second," etc. in the present disclosure may be used to explain different components, but such components are not limited thereto. These terms are used only to distinguish one component from other components. For example, a first component may also be named a second component without departing from the scope of the present invention. Likewise, the second component may also be named the first component. The term "and/or" may include a coupling of a plurality of related items and/or any one among the plurality of related items.

In addition, the terms such as a "part," "device," "block," "member," "module," and the like may refer to a unit to execute at least one function or operation. For example, the terms may refer to at least one hardware such as a field-programmable gate array (FPGA) or an application specific integrated circuit (ASIC), at least one operating process performed by at least one software stored in a memory or processor.

Hereinafter, preferred embodiments of the present invention will be described in detail with reference to the accompanying drawings.

Figure 2:
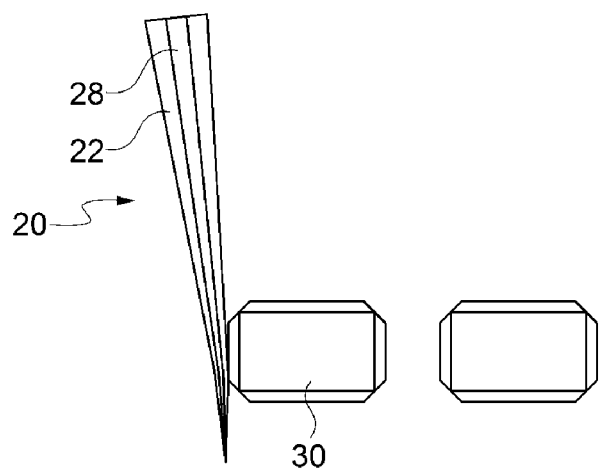

FIGS. 1 and 2 are views illustrating a nanopipette and a quartz tuning fork of a nano printing device according to an embodiment of the present invention.

A nano printing device 10 (see FIG. 3) may include a nanopipette 20.

The nanopipette 20 may be configured to contain a liquid solution 28. The liquid solution 28 may include nanomaterials 28a (see FIG. 4). The nanopipette 20 may include a pipette body 22 and a discharge hole 24 (see FIG. 4) formed in one end portion of the pipette body 22. The discharge hole 24 may have a diameter of a nano unit.

The nanopipette 20 is manufactured by preparing a pipette of quartz or borosilicate glass, and then elongating a tip of the pipette in a shape of a pen using a mechanical puller, so that the discharge hole 24 formed in the end portion thereof has a diameter of a nanoscale (nm) size.

Types of the liquid solution contained in the pipette body 22 are not limited. Neutral liquids with no electric potential may be used as the liquid solution, and various types of liquids, such as nanoparticles, CNT solutions, and even biomolecules, may be filled in the pipette body to shape a surface thereof.

Figure 4:
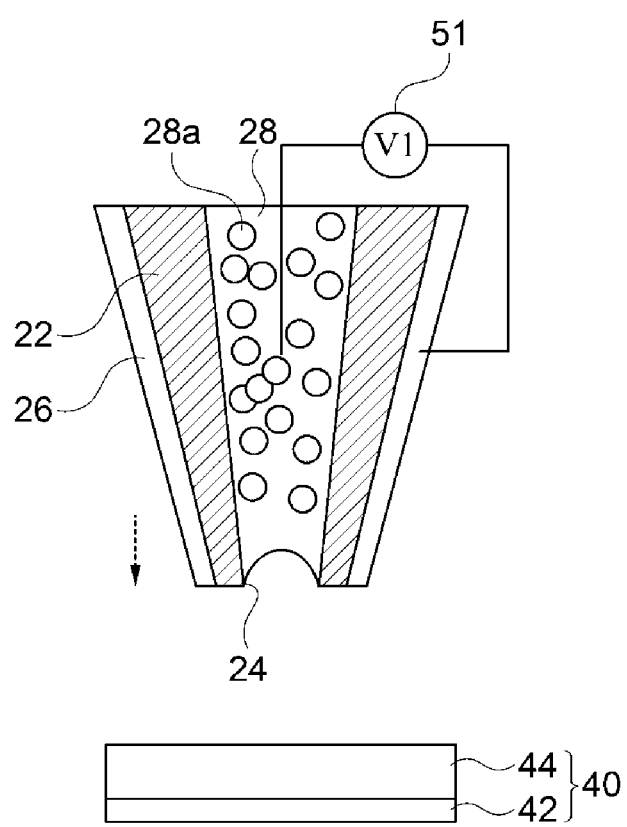
FIGS. 4, 5 and 6 are views illustrating movements of the nanopipette of the nano printing device according to an embodiment of the present invention.

The nanopipette 20 may include a plating layer 26 (see FIG. 4). The plating layer 26 is configured to cover an outer surface of the pipette body 22. The plating layer 26 may be configured to cover at least the pipette body 22 of a tip portion of the nanopipette 20 adjacent to the discharge hole 24.

The nano printing device 10 may include a quartz tuning fork 30.

The quartz tuning fork (QTF) is configured to abut the nanopipette 20 so as to receive oscillation transmitted from the nanopipette 20.

As shown in FIG. 1, a pen-shaped nanopipette 20 having a thinly drawn nano-sized hole is attached to a side of one leg of the quartz tuning fork (QTF) 30. As shown in FIG. 2, in a state where the nanopipette 20 is tilted at a predetermined angle, the quartz tuning fork 30 is brought close to and comes into contact with the side of the nanopipette 20 while being slightly bent. Through this process, the nanopipette 20 and the quartz tuning fork 30 are in contact with each other without fluctuation, such that the quartz tuning fork 30 may stably receive a force transmitted to the tip of the nanopipette 20.

Figure 3:
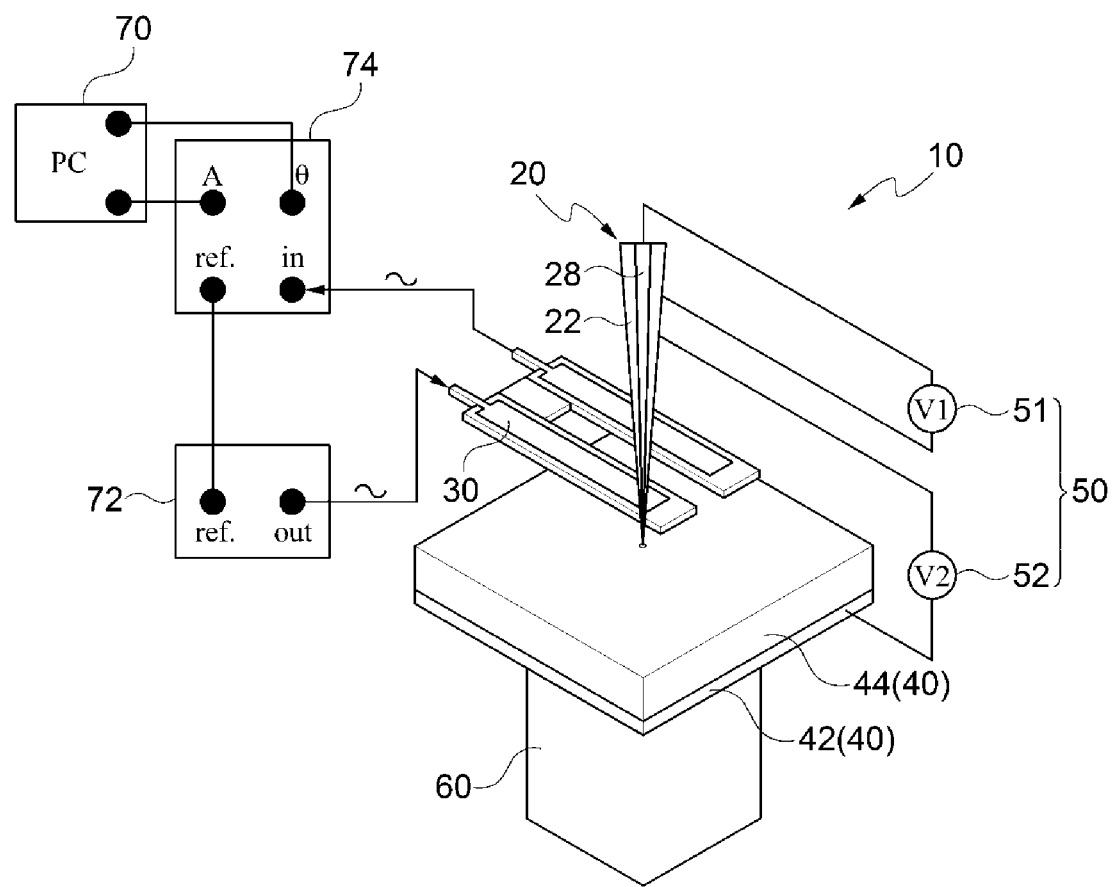
FIG. 3 is a view schematically illustrating the nano printing device according to an embodiment of the present invention.

FIG. 3 is a view schematically illustrating the nano printing device according to an embodiment of the present invention.

The nano printing device 10 may include a substrate 40.

The substrate 40 is configured to allow the liquid solution 28 discharged from the nanopipette 20 to be placed thereon.

In other words, the substrate 40 is provided so that the liquid solution 28 discharged from the nanopipette 20 is placed thereon. The substrate 40 may include a metal layer 42. The metal layer 42 may include gold or silver.

The substrate 40 may include a dielectric 44. The metal layer 42 may be formed on a lower surface of the dielectric 44. The metal layer 42 may be formed to be coated on the lower surface of the dielectric 44, or may be formed to be laminated on the lower surface of the dielectric 44.

The substrate 40 may include only the metal layer 42 or otherwise, as described above, may include both the dielectric 44 and the metal layer 42 formed on the lower surface thereof.

The nano printing device 10 may include a power supply unit.

A power supply unit 50 may be configured to apply a voltage to the nanopipette 20. The power supply unit may include a first power supply unit 51 and a second power supply unit 52.

The first power supply unit 51 may be configured to electrically connect the liquid solution 28 contained in the pipette body 22 and the plating layer 26 formed on the outer surface of the pipette body 22. The first power supply unit 51 may reduce a viscosity of the liquid solution 28 by applying heat to the liquid solution 28 by controlling the voltage. Due to the heat caused by a resistance generated from the nanopipette 20, the viscosity of the liquid solution 28 may be reduced. Specifically, heat may be generated in the tip portion of the nanopipette 20 by the voltage applied from the first power supply unit 51. Since the viscosity of the liquid is affected by a temperature, the first power supply unit 51 may reduce the viscosity of the liquid solution 28 by increasing the temperature of the liquid solution 28 inside the nanopipette 20. Thereby, the liquid solution 28 having a high viscosity may also be used in the nano printing device 10 of the present invention, such that various types of the liquid solution 28 may be applied.

The second power supply unit 52 is provided to reduce a surface tension of the liquid solution 28 at the discharge hole 24. The second power supply unit 52 may be configured to electrically connect the plating layer 26 and the metal layer 42. Due to the surface tension of the liquid solution 28, the liquid solution 28 may be discharged from the discharge hole 24 of the nanopipette 20 only when applying a predetermined force or more thereto. This surface tension of the liquid solution 28 may be greatly affected as the size of the discharge hole 24 is decreased. The second power supply unit 52 may reduce the surface tension of the liquid solution at the discharge hole 24 by allowing current to flow through the plating layer 26 and the metal layer 42.

By reducing the surface tension of the liquid solution using the second power supply unit 52, a liquid nanochannel 34 may be formed between the end of the nanopipette 20 having the discharge hole 24 and the substrate 40. That is, the liquid nanochannel 34 may be formed between the tip portion of the nanopipette 20 and the substrate 40. The liquid solution 28 may be discharged to the substrate 40 from the discharge hole 24 through the liquid nanochannel 34. The liquid nanochannel 34 may guide the liquid solution 28 from the discharge hole 24 to the substrate 40.

The first and second power supply units 51 and 52 may be operated independently from each other. That is, any one of the first and second power supply units 51 and 52 may not depend on the other power supply unit. The first and second power supply units 51 and 52 may be configured to be operated at voltages different from each other.

Hereinafter, an operation of the nano printing device using the nanopipette of the present invention will be described.

Figure 5:
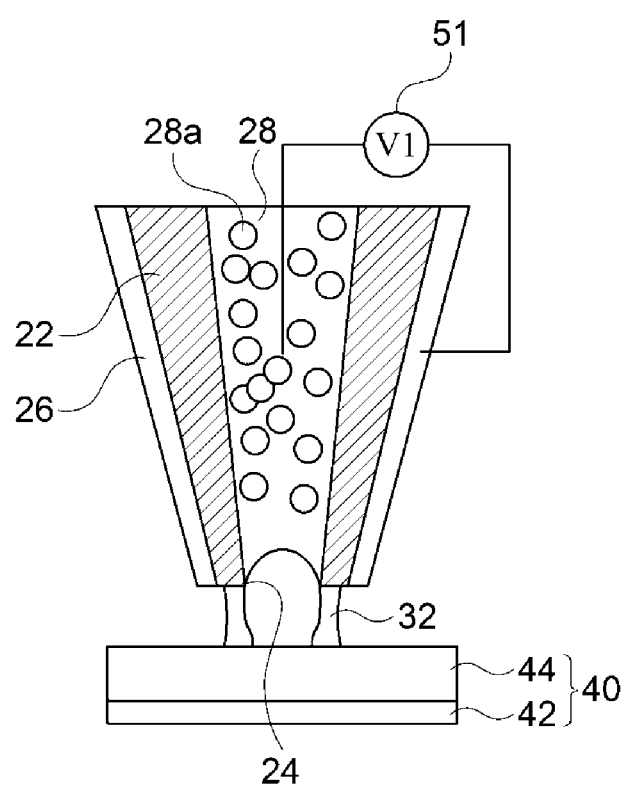
Figure 6:
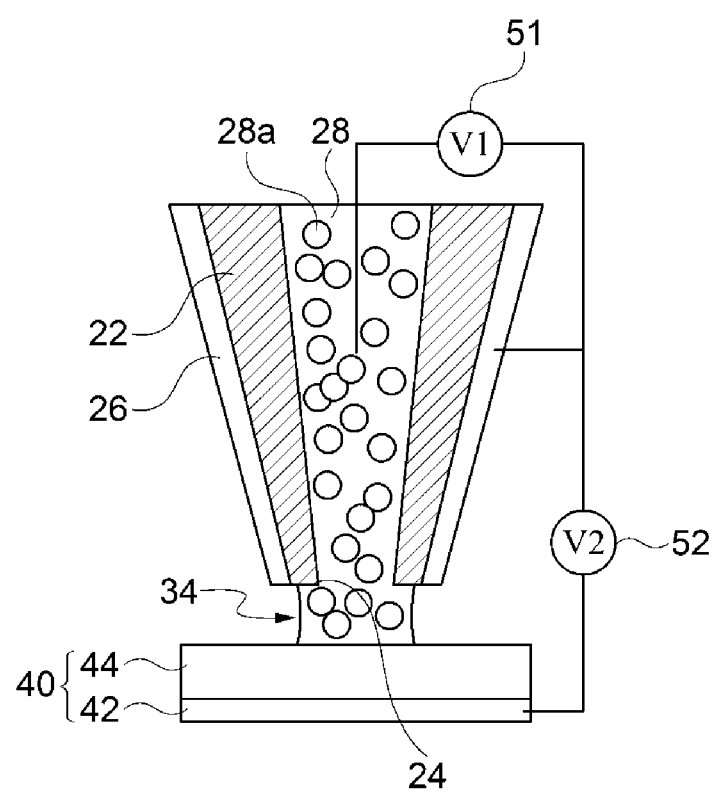

FIGS. 4, 5 and 6 are views illustrating movements of the nanopipette of the nano printing device according to an embodiment of the present invention.

First, as shown in FIG. 4, the nanopipette 20 and the quartz tuning fork 30 are brought close to an upper portion of the substrate 40.

Then, as shown in FIG. 5, when bringing an end of the nanopipette 20 close to the surface to be within about 10 nm therefrom, gaseous water molecules in the air go over an energy barrier which is decreased due to a narrowed gap between the end of the nanopipette 20 and the surface of the substrate 40, such that transition from a gaseous state to a liquid state may easily occur. In order to bring the nanopipette 20 close to the substrate 40, a piezoelectric transducer (PZT) 60 may be located on a lower portion of the substrate 40.

Thereby, the water molecules in the air form a nano-sized water meniscus 32 around the end of the nanopipette 20. A distance at which the water meniscus 32 is formed may be determined according to the relative humidity. When the water meniscus 32 is formed, a force is transmitted horizontally to the tip of the nanopipette 20. At this time, since the quartz tuning fork 30 is oscillating in a horizontal direction, a degree of the horizontal force may be accurately measured, and a distance between the surface of the substrate and the tip of the nanopipette 20 may be accurately maintained using a feedback technique of an atomic force microscope based on the measured force, and thereby it is possible to prevent the tip of the pipette from being broken.

As shown in FIG. 6, when the discharge hole 24 of the nanopipette 20 has a diameter larger than a predetermined size, as shown in FIG. 5, as soon as the water meniscus 32 is formed around the tip portion, the liquid nanochannel 34 is formed so that the liquid may be transferred to the surface of the substrate.

However, when the discharge hole 24 has a diameter smaller than a predetermined size, since the energy barrier due to the surface tension therein is still high, an electric field force to reduce the same is required. To this end, when a constant voltage is applied to the second power supply unit 52 which electrically connects the metal layer 42 on the lower surface of the dielectric 44 and the plating layer 26 of the nanopipette 20, the liquid nanochannel 34 is formed. That is, even when the discharge hole 24 has a diameter smaller than the predetermined size, the liquid solution may be ejected through the above-described process. The predetermined size of the discharge hole 24 may be 200 nm. The voltage applied to the second power supply unit 52 may be about 10 V.

The reason for arranging the metal layer 42 on the lower surface of the dielectric 44 is that when the nanopipette 20 comes into contact with a metal-coated surface, a flow rate of the discharged liquid is increased, and a large amount of liquid is transferred to the surface, such that the desired nano-sized printing cannot be implemented, as well as it is not intended to limit types of the substrate 40 to metal.

That is, the nano printing device 10 in the present embodiment may shape a nanoscale printing result on the surface of the substrate 40 while including the dielectric 44. Of course, the substrate 40 may include only the metal layer 42. In the case where the substrate 40 is made of metal and it is intended to print on the surface of the metal layer 42, it is possible to perform printing even with a very small single pulse voltage.

Hereinafter, an operation of the nano printing device according to an embodiment of the present invention will be described.

Figure 7:
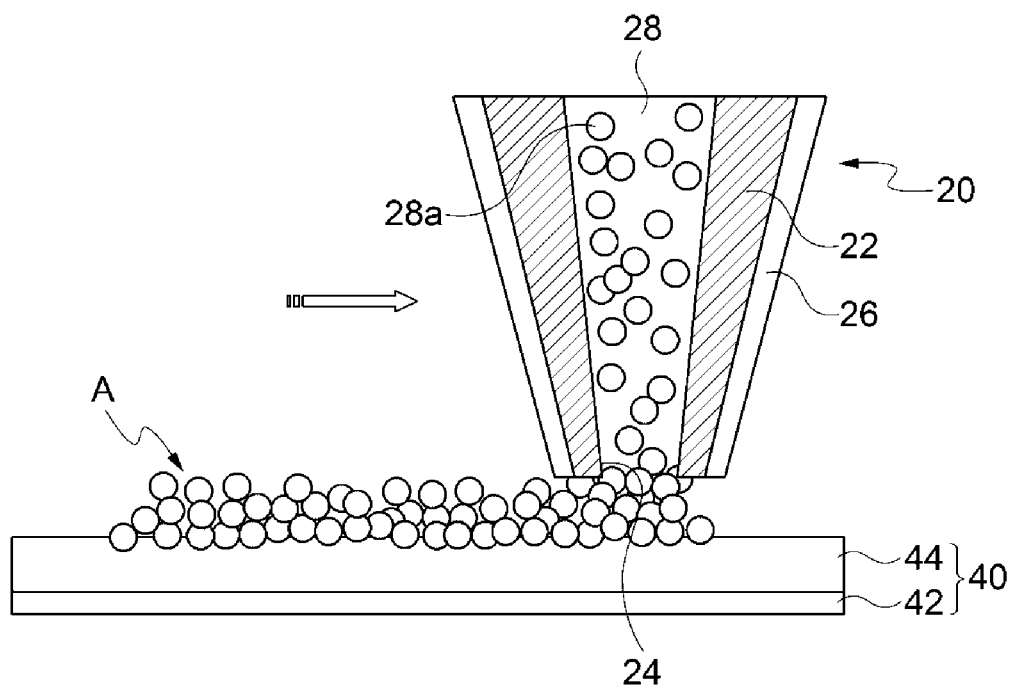
FIGS. 7 and 8 are views for describing operations of the nano printing device according to an embodiment of the present invention.
Figure 8:
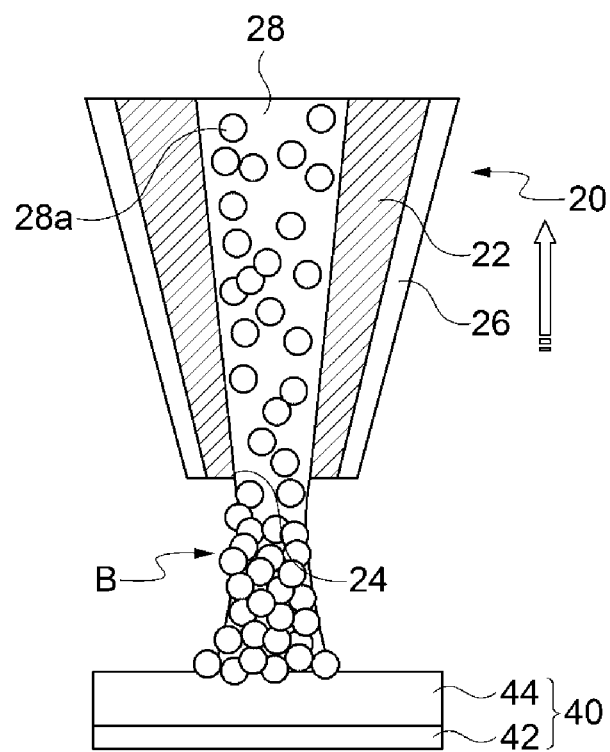

FIGS. 7 and 8 are views for describing the operation of the nano printing device according to an embodiment of the present invention.

As shown in FIG. 6, after the liquid nanochannel 34 is formed between the nanopipette 20 and the substrate 40, as shown in FIG. 7, two-dimensional nanoshaping (nanolithography) may be implemented as indicated by a symbol A while moving the nanopipette 20 or the substrate 40 in a lateral direction (i.e., x-direction or y-direction).

Further, after the liquid nanochannel 34 is formed between the nanopipette 20 and the substrate 40, as shown in FIG. 8, when moving the nanopipette 20 in an upper vertical direction (i.e., z direction), the liquid in the liquid solution 28 is evaporated into the air while leaving only various types of substances contained in the liquid, such that nanoshaping may be implemented as shown by a symbol B. That is, three-dimensional nanoshaping may be implemented through the nano printing device 10 using the nanopipette 20 of the present invention.

Hereinafter, a method of measuring physical properties of the liquid solution 28 using the nano printing device 10 will be described.

The quartz tuning fork 30 may measure a force applied to an object, specifically, viscous and elastic forces of the material. This may be measured using changes in the amplitude and phase due to the force applied to the oscillation at a resonance frequency of the quartz tuning fork 30. Herein, a viscoelastic force of the material may be measured by the following equations using an amount of fluctuation in the amplitude and phase. Using this, in-situ direct mechanical properties may be directly measured in a situation of nanolithography and 3D nanofabrication processes. In addition, current characteristics may be measured in a situation of transferring the material by applying a voltage thereto. By measuring the actually applied viscoelastic force and electrical properties of the material using these two measurement techniques, it is possible to perform an in-depth study on the precise control of the transmitted amount and the specificity of the material.

When applying an electric signal in a form of oscillation matched with the resonance frequency of the quartz tuning fork (QTF) 30 to which the nanopipette 20 is attached using a function generator 72, the quartz tuning fork 30 and the nanopipette 20 may be actually oscillated. Based on the movement actually oscillated due to the voltage applied to the quartz tuning fork 30, a motion of the quartz tuning fork 30 may be accurately determined by using information on the amplitude and phase of a current signal generated from the quartz tuning fork 30.

In fact, when the tip of the nanopipette 20 attached to the quartz tuning fork 30 is brought very close to the surface at a distance of less than 10 nm therefrom by a piezoelectric transducer (PZT) 60, the water meniscus 32 is formed around the tip of the nanopipette 20, and the movement of the nanopipette 20 is transmitted to the quartz tuning fork 30 by the capillary force, such that the amplitude and phase are changed. Therefore, by measuring the changes in the amplitude and phase and performing feedback thereof, a very stable nanochannel may be formed by maintaining the distance therebetween at an accurate position.

At this time, a magnitude of the electric signal applied from the function generator 72 is actually very small. When a reference signal, which is a very large electric signal in a form of a square or pulse corresponding to the same frequency, is input to a reference input terminal of equipment called a lock-in amplifier 74 electrically connected thereto, and an electric signal generated from the quartz tuning fork 30 due to the force applied to the tip of the nanopipette 20 is input to a signal input terminal of the lock-in amplifier, then accurate changes in the amplitude and phase may be obtained from an output device of the lock-in amplifier, and as shown in FIG. 3, it is possible to create data from the obtained results using a device which is connected to a computer (PC, controller) to convert an analog signal into a digital signal. The controller may accurately analyze the elastic force, viscous force, and energy dissipation degree of the material given from the surface through calculation of the obtained amplitude and phase data according to theory.

By measuring information on an amplitude A and a phase θ of a pendulum motion at the end of the nanopipette 20, and calculating an effective elastic coefficient kint and a viscosity coefficient bint by substituting the measured information into the following equations, an elastic force Fk and a viscous force Fb and energy dissipation Edis may be obtained (Q denotes the quality factor).

$$k_{int} = \frac{F}{A}\sin\theta + m\omega^2 - k$$

$$b_{int} = \frac{F}{A\omega}\cos\theta - b$$

$$F_k = k_{int}A$$

$$F_b = b_{int}\omega A$$

$$E_{dis} = \frac{\pi k A_0^2}{Q}\left[\frac{A}{A_0}\cos\theta - \frac{\omega}{\omega_0}\left(\frac{A}{A_0}\right)\right]$$

Hereinafter, a Raman analysis apparatus 100 using the nano printing device 10 of the present invention will be described.

Figure 9:
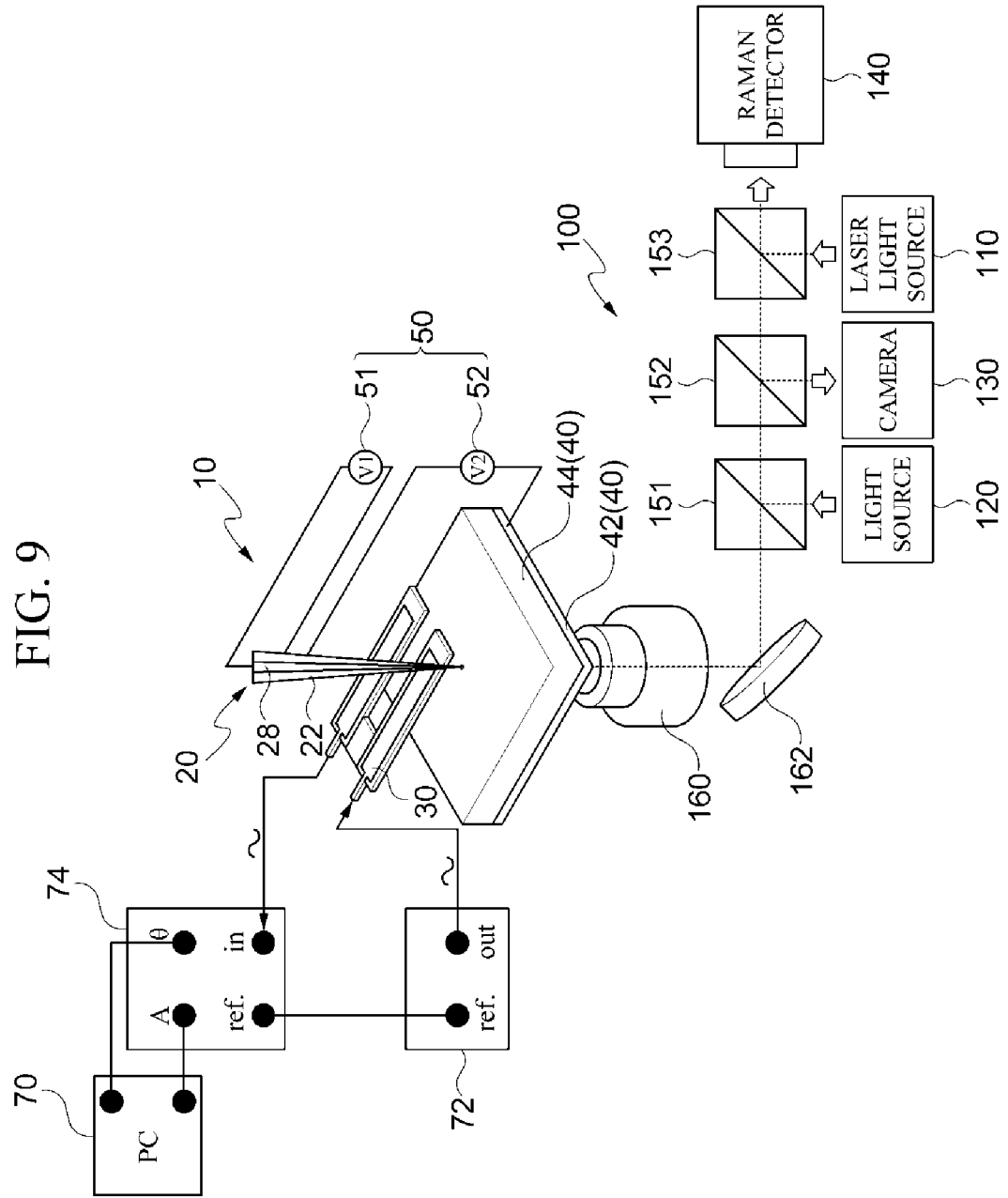
FIG. 9 is a view illustrating a Raman analysis apparatus using the nano printing device according to an embodiment of the present invention.

FIG. 9 is a view illustrating the Raman analysis apparatus using the nano printing device according to an embodiment of the present invention.

The Raman analysis apparatus 100 may perform Raman analysis on several nanostructures printed by the nanopipette 20. The Raman analysis apparatus 100 may analyze the nanostructures discharging from the nanopipette 20 or may analyze the nanostructures that have already been discharged by the nanopipette 20.

The Raman analysis apparatus 100 may include a laser light source 110 configured to generate and emit a laser light, a light source 120 for confirming a position of the manufactured object so as to accurately irradiate the nanostructures with the emitted light, a camera 130 (CCD), and a Raman detector 140 configured to measure the scattered light. In addition, the Raman analysis apparatus 100 may include beam splitters 151, 152 and 153 provided on a path of light between the respective components to control the light path.

The laser light source 110 may have a different wavelength of the emitted laser light depending on the types of liquid solution. The wavelength of the laser light may include 488 nm, 532 nm and 633 nm. For example, when the liquid solution 28 is a gold nanoparticle solution, a laser light having a wavelength of 633 nm may be used. When the liquid solution 28 is a silver nanoparticle solution, a laser light having a wavelength of 532 nm may be used.

The light source 120 and the camera 130 themselves may also accurately detect a state of the surface of the nanostructure at a very high rate. That is, the light source and the camera 130 may be used as an optical microscope. Through this configuration, the Raman analysis apparatus 100 using the nano printing device 10 may perform the process while checking the movement of the nanopipette 20 and the state of the liquid solution 28 ejected through the nanopipette 20 in manufacturing processes of the 2D and 3D nanostructures, and Raman analysis may be performed together therewith during the processes.

The Raman detector 140 is configured to measure light scattered from the nanostructures. The Raman detector 140 is provided to analyze nano-shaped spectroscopic information through the scattered light.

The laser light emitted from the laser light source 110 passes through the beam splitters 153 and is incident on the substrate 40 through a mirror 162 and an objective lens 160, thus to meet the nanostructures on the substrate 40.

The laser light may be adjusted by the beam splitter 153 to be incident on the objective lens 160. The laser light source 110 may emit laser light to the nanostructures along an optical path from the beam splitter 153 through the objective lens 160 to the nanostructures. The laser light incident through the objective lens 160 collides with the nanostructures to be scattered. At this time, most of the laser light is scattered with the same energy as the incident light, but some of the laser light is inelastically scattered by exchanging energy with the nanostructures to a unique degree.

The light incident through the objective lens from the light source collides with the nanostructures to be scattered. At this time, most of the light is scattered with the same energy as the incident light, but some of the light is inelastically scattered by exchanging energy with the nanostructures to a unique degree.

In this case, scattering may include Stokes scattering in which light from the light source loses energy, and Anti-Stokes scattering in which light from the light source gains energy depending on the physical properties of the nanostructures, and the wavelength of each scattering appears in a unique form thereof. The Raman detector 140 may collect the scattered light and display as a uniquely shaped spectrum.

As described above, after repeatedly capturing Raman spectrum images through the Raman analysis apparatus 100, it is possible to analyze the characteristics of the nanostructures by using a computer (not shown).

The Raman analysis apparatus 100 may perform high-resolution Raman spectroscopy using the Raman signal amplified or enhanced by the plating layer 26 of the nanopipette 20. This method is referred to as tip-enhanced Raman spectroscopy (TERS). The tip-enhanced Raman spectroscopy is a spectroscopy method that probes Raman spectra of several tens of nm around the tip using plasmons which are very strongly increased at the tip of the nanopipette 20. In the Raman analysis apparatus 100 of the present invention, the nanopipette 20 may be applied as a probe for enhancing the Raman signal of the tip-enhanced Raman spectroscopy.

As described above, it is possible to reduce the time for searching for the nanostructures through the plating layer 26 of the nanopipette 20, and prevent deformation or contamination of the object to be measured due to a movement of the nanostructures and a time delay for analysis. Further, even when the nano printing device 10 is in operation, the Raman analysis apparatus 100 may be operated, thus to analyze the nanostructures in real time.

Hereinafter, an operation of the Raman analysis apparatus according to an embodiment of the present invention will be described.

Figure 10:
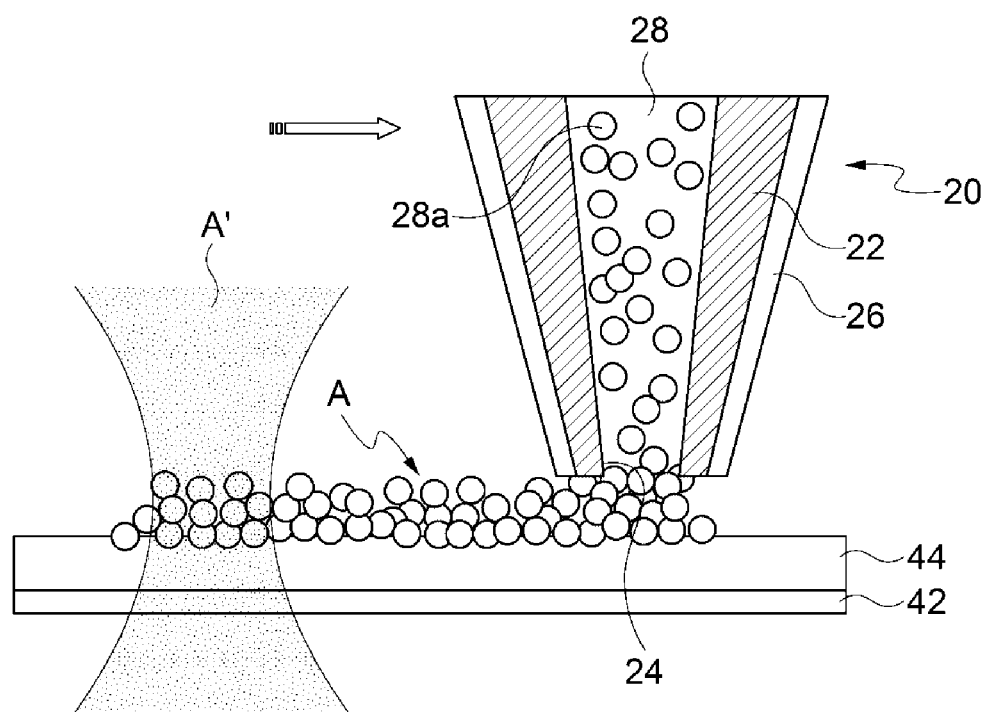
FIGS. 10 and 11 are views for describing operations of the nano printing device and the Raman analysis apparatus according to an embodiment of the present invention.
Figure 11:
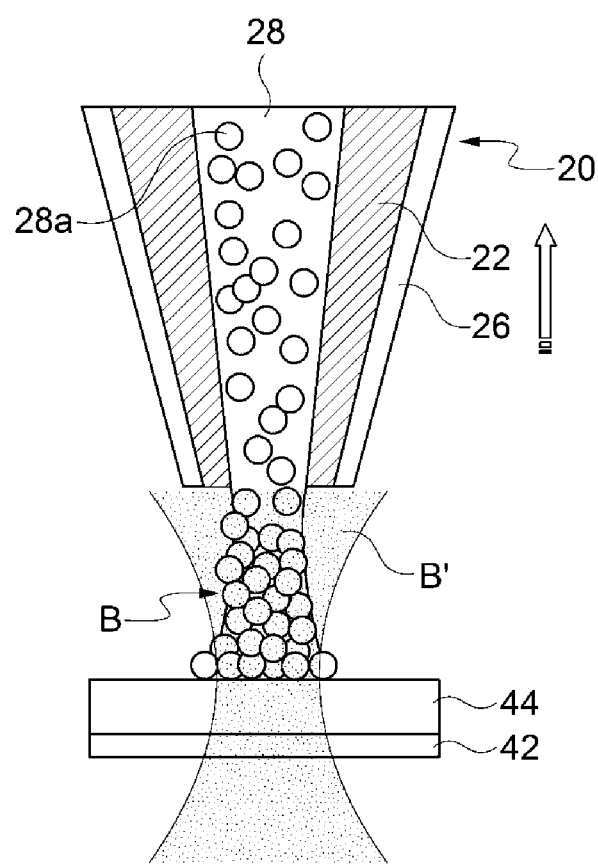

FIGS. 10 and 11 are views for describing operations of the nano printing device and the Raman analysis apparatus according to an embodiment of the present invention. The operations will be described with reference to the previously described FIGS. 6, 7 and 8 together.

As shown in FIG. 6, after the liquid nanochannel 34 is formed between the nanopipette 20 and the substrate 40, as shown in FIG. 7, two-dimensional nanoshaping (nanolithography) may be implemented as indicated by a symbol A while moving the nanopipette 20 or the substrate 40 in the lateral direction (i.e., x-direction or y-direction). In this process, as shown by a symbol A' in FIG. 10, spectroscopic information of the nanostructures may be analyzed through the Raman analysis apparatus 100.

Further, after the liquid nanochannel 34 is formed between the nanopipette 20 and the substrate 40, as shown in FIG. 8, when moving the nanopipette 20 in an upper vertical direction (i.e., z direction), the liquid in the liquid solution 28 is evaporated into the air while leaving only various types of substances contained in the liquid, such that nanoshaping may be implemented as shown by a symbol B. That is, three-dimensional nanoshaping may be implemented through the nano printing device 10 using the nanopipette 20 of the present invention. In this process, as shown by a symbol B' in FIG. 11, spectroscopic information of the nanostructures may be analyzed through the Raman analysis apparatus 100. In this case, after the nanostructures are prepared, the position of the nanopipette 20 may be moved to a side of the nanostructures to perform Raman spectroscopy.

The above-described Raman analysis apparatus using the nano printing device 10 may perform operation and analysis together with the operation of the nano printing device, or may perform operation and analysis after the operation of the nano printing device is started.

As such, specific embodiments of the present invention have been illustrated and described in detail. However, the present invention is not limited to the above embodiments, and it will be understood by those skilled in the art that various alterations and modifications may be implemented without departing from technical spirits of the invention described in the following claims.

What is claimed is:

1. A nano printing device comprising:
a nanopipette which includes a pipette body having a discharge hole formed in one end portion thereof and configured to contain a liquid solution, and a plating layer formed on an outer surface of the pipette body;
a substrate having a metal layer and on which nanostructures formed from the liquid solution discharged from the nanopipette are placed;
a first power supply unit configured to apply heat to the nanopipette, wherein the first power supply unit electrically connects the liquid solution of the pipette body and the plating layer;
a second power supply unit configured to reduce a surface tension of the liquid solution at the discharge hole, wherein the second power supply unit electrically connects the plating layer and the metal layer; and
a quartz tuning fork provided to be in contact with the nanopipette,
wherein the quartz tuning fork is configured to detect a phase and an amplitude generated at the end of the nanopipette,
wherein the phase and amplitude satisfy the following equations:

$$k_{int} = \frac{F}{A}\sin\theta + m\omega^2 - k$$

$$b_{int} = \frac{F}{A\omega}\cos\theta - b$$

$$F_k = k_{int}A$$

$$F_b = b_{int}\omega A$$

$$E_{dis} = \frac{\pi k A_0^2}{Q}\left[\frac{A}{A_0}\cos\theta - \frac{\omega}{\omega_0}\left(\frac{A}{A_0}\right)\right]$$

wherein, kint denotes an elastic coefficient, bint denotes a viscosity coefficient, Fk denotes an elastic force, Fb denotes a viscous force, Edis denotes an energy dissipation, and Q denotes a quality factor.

2. The nano printing device according to claim 1, wherein the first and second power supply units are configured to be operated independently from each other.

3. The nano printing device according to claim 1, wherein the first and second power supply units are configured to be operated at voltages different from each other.

4. The nano printing device according to claim 1, wherein the first power supply unit is configured to reduce a viscosity of the liquid solution by heating the pipette body.

5. The nano printing device according to claim 4, wherein the plating layer is configured to cover at least an end portion of the pipette body.

6. The nano printing device according to claim 4, wherein the plating layer comprises at least one of gold and silver.

7. The nano printing device according to claim 1, wherein the second power supply unit is configured to form a nanochannel for guiding a movement of the liquid solution between an end of the nanopipette having the discharge hole formed therein and the substrate.

8. An apparatus for forming and analyzing a nanostructure, the apparatus comprising:
a nano printing device configured to form the nanostructure, the nano printing device comprising:
a nanopipette which includes a pipette body having a discharge hole formed in one end portion thereof and configured to contain a liquid solution, and a plating layer formed on an outer surface of the pipette body;
a substrate having a metal layer and on which the nanostructure formed from the liquid solution discharged from the nanopipette are placed;
a first power supply unit configured to electrically connect the liquid solution of the pipette body and the plating layer so as to apply heat to the liquid solution;

a second power supply unit configured to reduce a surface tension of the liquid solution at the discharge hole, wherein the second power supply unit electrically connects the plating layer and the metal layer; and a quartz tuning fork provided to be in contact with the nanopipette, wherein the quartz tuning fork is configured to detect a phase and an amplitude generated at the end of the nanopipette, wherein the phase and amplitude satisfy the following equations:

$$k_{int} = \frac{F}{A}\sin\theta + m\omega^2 - k$$

$$b_{int} = \frac{F}{A\omega}\cos\theta - b$$

$$F_k = k_{int}A$$

$$F_b = b_{int}\omega A$$

$$E_{dis} = -\frac{\pi k A_0^2}{Q}\left[\frac{A}{A_0}\cos\theta - \frac{\omega}{\omega_0}\left(\frac{A}{A_0}\right)\right]$$

wherein, kint denotes an elastic coefficient, bint denotes a viscosity coefficient, Fk denotes an elastic force, Fb denotes a viscous force, Edis denotes an energy dissipation, and Q denotes a quality factor; and a Raman spectroscopy apparatus configured to analyze the nanostructure formed from the nano printing device, the Raman spectroscopy apparatus comprising:
a laser light source configured to generate and emit a laser light to the nanostructure; and
a Raman detector configured to collect spectroscopic information from the light scattered by the nanostructure.

9. The apparatus of claim 8, wherein the nanostructure is subjected to tip-enhanced Raman spectroscopy (TERS) performed through the plating layer connected with the first and second power supply units.

10. The apparatus of claim 9, wherein the plating layer includes at least one of gold and silver.

11. The apparatus of claim 9, wherein the plating layer is configured to cover at least an end portion of the pipette body.

12. The apparatus of claim 9, wherein the first and second power supply units are configured to be operated independently from each other.

13. The apparatus of claim 10, wherein the first and second power supply units are configured to be operated at voltages different from each other.

14. The apparatus of claim 8, wherein the Raman analysis of the nanostructure is provided to be performed together with formation of the nanostructure by the nano printing device.

15. The apparatus of claim 8, wherein the laser light source is configured to generate a laser light having at least one of wavelengths of 488 nm, 532 nm and 633 nm.

* * * * *